United States Patent
Nishikubo et al.

(10) Patent No.: US 12,275,665 B2
(45) Date of Patent: Apr. 15, 2025

(54) GLASS COMPOSITION FOR GLASS FIBERS, GLASS FIBERS, WOVEN GLASS FIBER FABRIC, AND GLASS-FIBER-REINFORCED RESIN COMPOSITION

(71) Applicant: NITTO BOSEKI CO., LTD., Fukushima (JP)

(72) Inventors: Ryo Nishikubo, Koriyama (JP); Tatsuya Komukai, Koriyama (JP); Tadashi Kurita, Koriyama (JP); Koichi Nakamura, Koriyama (JP); Takashi Nonaka, Koriyama (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 18/726,196

(22) PCT Filed: Apr. 5, 2023

(86) PCT No.: PCT/JP2023/014110
§ 371 (c)(1),
(2) Date: Jul. 2, 2024

(87) PCT Pub. No.: WO2023/228594
PCT Pub. Date: Nov. 30, 2023

(65) Prior Publication Data
US 2024/0417315 A1    Dec. 19, 2024

(30) Foreign Application Priority Data
May 23, 2022 (JP) .................. 2022-083983

(51) Int. Cl.
C03C 13/00 (2006.01)
C08K 7/14 (2006.01)
D03D 15/267 (2021.01)

(52) U.S. Cl.
CPC .............. *C03C 13/00* (2013.01); *C08K 7/14* (2013.01); *D03D 15/267* (2021.01)

(58) Field of Classification Search
None
See application file for complete search history.

(56) References Cited

U.S. PATENT DOCUMENTS

| 9,878,942 B2 | 1/2018 | Nonaka et al. |
| 11,905,199 B2 | 2/2024 | Li et al. |

FOREIGN PATENT DOCUMENTS

| CN | 103339076 A | * | 10/2013 |
| DE | 2528916 A1 | * | 1/1977 |
| JP | 2011-105554 A | | 6/2011 |
| JP | 5988013 B1 | | 9/2016 |
| JP | 2017-526607 A | | 9/2017 |
| WO | 2012/104999 A1 | | 8/2012 |

OTHER PUBLICATIONS

PCT/ISA/210 dated Jul. 4, 2023, issued in International Application PCT/JP2023/014110 with the English translation thereof.
PCT/ISA/237 dated Jul. 4, 2023, issued in International Application PCT/JP2023/014110.

* cited by examiner

*Primary Examiner* — Tae H Yoon
(74) *Attorney, Agent, or Firm* — Carrier, Shende & Associates P.C.; Joseph P. Carrier; Fulchand P. Shende

(57) ABSTRACT

A glass composition for glass fibers including 50.0 to 70.0% by mass of $SiO_2$, 10.0 to 30.0% by mass of $Al_2O_3$, 8.0 to 25.0% by mass of ZnO, 0.0 to 8.0% by mass of MgO, 0.0 to 5.0% by mass of CaO, 0.0 to 8.0% by mass of $P_2O_5$, 0.0 to 2.5% by mass of $TiO_2$, and 0.0% by mass or more and less than 1.0% by mass in total of $Li_2O$, $Na_2O$, and $K_2O$, and when the contents of $SiO_2$, $Al_2O_3$, ZnO, MgO, CaO, and $P_2O_5$ are defined as S, A, Z, M, C, and P, respectively, (M+C)/Z is 0.46 or less and the S, A, and P satisfy the following formula (1-1): $28.0 \leq \{(S-P) \times (A-P)\}^{1/2} \leq 36.9$ ... (1-1).

8 Claims, No Drawings

GLASS COMPOSITION FOR GLASS FIBERS, GLASS FIBERS, WOVEN GLASS FIBER FABRIC, AND GLASS-FIBER-REINFORCED RESIN COMPOSITION

CROSS-REFERENCE TO RELATED APPLICATION

This application is a US National Phase Application of International Application PCT/JP2023/014410, filed Apr. 5, 2023, which claims the benefit of priority from Japanese Patent Application No. 2022-083983 filed on May 23, 2022.

TECHNICAL FIELD

The present invention relates to a glass composition for glass fibers, glass fibers, a woven glass fiber fabric, and a glass-fiber-reinforced resin composition.

BACKGROUND ART

Conventionally, glass fiber has been widely used to improve the strength of resin compositions, and the resin compositions have been increasingly used for a housing or a part of electronic devices such as a server, a smartphone, a laptop computer, and the like. In recent years, as the electronic devices have become smaller and lighter, printed circuit boards used in the electronic devices have become thinner, and the printed circuit boards are required not only to have high rigidity but also to have excellent dimensional stability. Therefore, glass fiber used for reinforcing the printed wiring boards is particularly required to have a low coefficient of linear thermal expansion.

S-glass composition is known as a glass fiber composition with a high elastic modulus and a low coefficient of linear thermal expansion. However, glass compositions for glass fiber with S glass composition has a high liquid phase temperature, which means that the temperature of the molten glass must be kept high during the production of glass fiber, but when doing so, the viscosity of the molten glass is too low, posing a problem that it is difficult to perform spinning stably. In order to solve the problem, the present applicant has proposed a glass composition for glass fiber that can lower the liquid phase temperature while maintaining a high elastic modulus (see, for example, Patent Literature 1).

CITATION LIST

Patent Literature

Patent Literature 1: Japanese Patent No. 5988013

SUMMARY OF INVENTION

Technical Problem

However, the glass composition for glass fiber described in Patent Literature 1 has a disadvantage that the coefficient of linear thermal expansion is not sufficiently low, leading to a disadvantage that it is difficult to achieve both a high elastic modulus and a low coefficient of linear thermal expansion while suppressing an increase in the liquid phase temperature.

In addition, some glass compositions for glass fiber have a disadvantage that pronounced phase separation occurs, making it difficult to convert the molten glass into fibers. Also, some glass compositions for glass fiber have a sufficiently low liquid phase temperature but a fast crystallization rate, and therefore, when molten glass is discharged from a nozzle to form fibers, it is crystallized in a short time as it passes through the nozzle section, causing nozzle clogging, leading to a disadvantage that it is difficult to form fibers. Note that the phase separation is a phase separation phenomenon in which a single phase of glass forms glass layers with different compositions due to heat and other factors.

An object of the present invention is, by eliminating the disadvantages, to provide a glass composition for glass fiber with a low coefficient of linear thermal expansion, a high elastic modulus, a low liquid phase temperature, a slow crystallization rate, and suppressed phase separation.

Another object of the present invention is to provide glass fiber formed from the glass composition for glass fiber, as well as a glass fiber woven fabric and a glass fiber-reinforced resin composition using the glass fiber.

Solution to Problem

In order to achieve the object, the glass composition for glass fiber of the present invention includes $SiO_2$ in the range of 50.0 to 70.0% by mass, $Al_2O_3$ in the range of 10.0 to 30.0% by mass, ZnO in the range of 8.0 to 25.0% by mass, MgO in the range of 0.0 to 8.0% by mass, CaO in the range of 0.0 to 5.0% by mass, $P_2O_5$ in the range of 0.0 to 8.0% by mass, $TiO_2$ in the range of 0.0 to 2.5% by mass, and $Li_2O$, $Na_2O$, and $K_2O$ in the range of 0.0% by mass or more and less than 1.0% by mass in total, with respect to the total amount, and when the content of $SiO_2$ is defined as S, the content of $Al_2O_3$ is defined as A, the content of ZnO is defined as Z, the content of MgO is defined as M, the content of CaO is defined as C, and the content of $P_2O_5$ is defined as P, the ratio of the total content of CaO and MgO to the content of ZnO((M+C)/Z) is 0.46 or less, and the S, A, and P satisfy following formula (1-1):

$$28.0 \leq \{(S-P) \times (A-P)\}^{1/2} \leq 36.9. \tag{1-1}$$

According to the glass composition for glass fiber of the present invention, it includes $SiO_2$, $Al_2O_3$, ZnO, MgO, CaO, $P_2O_5$, $TiO_2$, $Li_2O$, $Na_2O$, and $K_2O$ in the ranges described above, and when the content of $SiO_2$ is defined as S, the content of $Al_2O_3$ is defined as A, the content of ZnO is defined as Z, the content of MgO is defined as M, the content of CaO is defined as C, and the content of $P_2O_5$ is defined as P, the ratio of the total content of CaO and MgO to the content of ZnO ((M+C)/Z) is 0.46 or less, and the S, A, and P satisfy the above formula (1-1), resulting in a low liquid phase temperature, a slow crystallization rate, suppressed phase separation, and a low coefficient of linear thermal expansion and a high elastic modulus of the glass composition for glass fiber.

Note that, here, the glass composition for glass fiber having a low liquid phase temperature means that the liquid phase temperature is 1520° C. or lower. Also, the glass composition for glass fiber having a low coefficient of linear thermal expansion means that the coefficient of linear thermal expansion is $30 \times 10^{-7}$/K or less, and the glass composition for glass fiber having a high elastic modulus means that the elastic modulus is 75 GPa or more.

In addition, suppressed phase separation means that there is no cloudiness (phase separation) in the test piece as observed by the method described later, and that the boundary surface can be clearly observed.

Also, the liquid phase temperature, coefficient of linear thermal expansion, and elastic modulus of the glass composition for glass fiber can be measured by the methods described later.

In addition, the glass composition for glass fiber of the present invention includes $SiO_2$, $Al_2O_3$, ZnO, MgO, CaO, $P_2O_5$, $TiO_2$, $Li_2O$, $Na_2O$, and $K_2O$ in the ranges described above, and the S, A, and P preferably satisfy the following formula (1-2):

$$28.6 \leq \{(S-P) \times (A-P)\}^{1/2} \leq 33.8. \quad (1-2)$$

When the glass composition for glass fiber of the present invention includes $SiO_2$, $Al_2O_3$, ZnO, MgO, CaO, $P_2O_5$, $TiO_2$, $Li_2O$, $Na_2O$, and $K_2O$ in the ranges described above, and when the S, A, and P satisfy the above formula (1-2), the liquid phase temperature is lower, the coefficient of linear thermal expansion of the glass composition for glass fiber is lower, and the elastic modulus is E glass or more.

Note that, here, the glass composition for glass fiber having a lower liquid phase temperature means that the liquid phase temperature is 1490° C. or lower. Also, the glass composition for glass fiber having a lower coefficient of linear thermal expansion means that the coefficient of linear thermal expansion is $27 \times 10^{-7}$/K or less, and the glass composition for glass fiber having an elastic modulus of E glass or more means that the elastic modulus is 88 GPa or more.

In addition, the glass composition for glass fiber of the present invention includes $SiO_2$, $Al_2O_3$, ZnO, MgO, CaO, $P_2O_5$, $TiO_2$, $Li_2O$, $Na_2O$, and $K_2O$ in the ranges described above, and the S, A, and P preferably satisfy the following formula (2-1):

$$P \times \{Z/(Z+C+M)\} \times (S/A) \leq 10.72. \quad (2-1)$$

When the glass composition for glass fiber of the present invention includes $SiO_2$, $Al_2O_3$, ZnO, MgO, CaO, $P_2O_5$, $TiO_2$, $Li_2O$, $Na_2O$, and $K_2O$ in the ranges described above, and when the S, A, and P satisfy the above formula (2-1), the coefficient of linear thermal expansion of the glass composition for glass fiber is lower, and the elastic modulus is E glass or more.

Note that, here, the glass composition for glass fiber having a lower coefficient of linear thermal expansion and an elastic modulus of E glass or more is synonymous with the aforementioned contents.

In addition, the glass composition for glass fiber of the present invention includes $SiO_2$, $Al_2O_3$, ZnO, MgO, CaO, $P_2O_5$, $TiO_2$, $Li_2O$, $Na_2O$, and $K_2O$ in the ranges described above, and the S, A, and P preferably satisfy the following formulas (1-3) and (2-2):

$$29.5 \leq \{(S-P) \times (A-P)\}^{1/2} \leq 31.2 \quad (1-3)$$

$$7.15 \leq P \times \{Z/(Z+C+M)\} \times (S/A) \leq 10.40. \quad (2-2)$$

When the glass composition for glass fiber of the present invention includes $SiO_2$, $Al_2O_3$, ZnO, MgO, CaO, $P_2O_5$, $TiO_2$, $Li_2O$, $Na_2O$, and $K_2O$ in the ranges described above, and when the S, A, and P satisfy the above formula (2-1), the liquid phase temperature is further lower, the coefficient of linear thermal expansion of the glass composition for glass fiber is further lower, and the elastic modulus is E glass or more.

Note that, here, the glass composition for glass fiber having a further lower liquid phase temperature means that the liquid phase temperature is 1465° C. or lower. Also, the glass composition for glass fiber having a further lower coefficient of linear thermal expansion means that the coefficient of linear thermal expansion is $24 \times 10^{-7}$/K or less, and an elastic modulus of E glass or more is synonymous with the aforementioned contents.

Also, the glass composition for glass fiber of the present invention includes, for example, $Al_2O_3$ in the range of 20.5 to 25.0% by mass, and ZnO, MgO, and CaO in the range of 15.5 to 25.0% by mass in total, with respect to the total amount.

Also, the glass fiber of the present invention is formed from the glass composition for glass fiber of the present invention. Also, the glass fiber woven fabric of the present invention is formed from the glass fiber of the present invention, and the glass fiber-reinforced resin composition of the present invention includes the glass fiber of the present invention.

DESCRIPTION OF EMBODIMENTS

Hereinafter, embodiments of the present invention will be described in detail.

The glass composition for glass fiber of the present embodiment includes $SiO_2$ in the range of 50.0 to 70.0% by mass, $Al_2O_3$ in the range of 10.0 to 30.0% by mass, ZnO in the range of 8.0 to 25.0% by mass, MgO in the range of 0.0 to 8.0% by mass, CaO in the range of 0.0 to 5.0% by mass, $P_2O_5$ in the range of 0.0 to 8.0% by mass, $TiO_2$ in the range of 0.0 to 2.5% by mass, and $Li_2O$, $Na_2O$, and $K_2O$ in the range of 0.0% by mass or more and less than 1.0% by mass in total, with respect to the total amount, and when the content of $SiO_2$ is defined as S, the content of $Al_2O_3$ is defined as A, the content of ZnO is defined as Z, the content of MgO is defined as M, the content of CaO is defined as C, and the content of $P_2O_5$ is defined as P, the ratio of the total content of CaO and MgO to the content of ZnO (that is, (M+C)/Z) is 0.46 or less, and the S, A, and P satisfy following formula (1-1):

$$28.0 \leq \{(S-P) \times (A-P)\}^{1/2} \leq 36.9. \quad (1-1)$$

According to the glass composition for glass fiber, it includes $SiO_2$, $Al_2O_3$, ZnO, MgO, CaO, $P_2O_5$, $TiO_2$, $Li_2O$, $Na_2O$, and $K_2O$ in the ranges described above, and when the content of $SiO_2$ is defined as S, the content of $Al_2O_3$ is defined as A, the content of ZnO is defined as Z, the content of MgO is defined as M, the content of CaO is defined as C, and the content of $P_2O_5$ is defined as P, the ratio of the total content of CaO and MgO to the content of ZnO ((M+C)/Z) is 0.46 or less, and the S, A, and P satisfy the above formula (1-1), resulting in a low liquid phase temperature, a slow crystallization rate, suppressed phase separation, and a low coefficient of linear thermal expansion and a high elastic modulus of the glass composition for glass fiber.

When the glass composition for glass fiber of the present embodiment has a content of $SiO_2$ of less than 50.0% by mass with respect to the total amount of the glass composition for glass fiber, the coefficient of linear thermal expansion of the glass composition for glass fiber cannot be sufficiently reduced. Also, when the glass composition for glass fiber of the present embodiment has a content of $SiO_2$ of more than 70.0% by mass with respect to the total amount of the glass composition for glass fiber, the viscosity at high temperatures is increased. Thus, the melt temperature and spinning temperature rise, and stable glass fiber manufacturing cannot be conducted. Note that the glass composition for glass fiber having an increased viscosity at high temperatures means that the 1000 poise temperature rises.

Also, when the glass composition for glass fiber of the present embodiment has a content of $SiO_2$ of more than 70.0% by mass with respect to the total amount of the glass composition for glass fiber, the elastic modulus of the glass composition for glass fiber cannot be maintained.

In the glass composition for glass fiber of the present embodiment, the content of $SiO_2$ with respect to the total amount of the glass composition for glass fiber is preferably in the range of 51.0 to 66.0% by mass, more preferably in the range of 52.5 to 64.5% by mass, still more preferably in the range of 53.0 to 63.0% by mass, markedly preferably in the range of 53.5 to 61.0% by mass, particularly preferably in the range of 54.0 to 60.0% by mass, especially preferably in the range of 54.0 to 58.0% by mass, and most preferably in the range of 54.5 to 57.5% by mass.

When the glass composition for glass fiber of the present embodiment has a content of $Al_2O_3$ of less than 10.0% by mass with respect to the total amount of the glass composition for glass fiber, phase separation occurs in the glass composition for glass fiber, and it is difficult to perform spinning. Also, when the glass composition for glass fiber of the present embodiment has a content of $Al_2O_3$ of more than 30.0% by mass with respect to the total amount of the glass composition for glass fiber, the liquid phase temperature of the glass composition for glass fiber rises, and it is difficult to perform spinning.

In the glass composition for glass fiber of the present embodiment, the content of $Al_2O_3$ with respect to the total amount of the glass composition for glass fiber is preferably in the range of 12.6 to 28.0% by mass, more preferably in the range of 15.1 to 27.5% by mass, still more preferably in the range of 15.6 to 27.0% by mass, markedly preferably in the range of 19.0 to 26.5% by mass, particularly preferably in the range of 20.1 to 26.0% by mass, especially preferably in the range of 20.5 to 25.0% by mass, and most preferably in the range of 21.0 to 24.0% by mass.

When the glass composition for glass fiber of the present embodiment has a content of ZnO of less than 8.0% by mass with respect to the total amount of the glass composition for glass fiber, the liquid phase temperature of the glass composition for glass fiber rises, and it is difficult to perform spinning. Also, when the glass composition for glass fiber of the present embodiment has a content of ZnO of more than 25.0% by mass with respect to the total amount of the glass composition for glass fiber, the high temperature viscosity of the glass composition for glass fiber decreases and the liquid phase temperature rises, making it difficult to perform spinning. Note that the glass composition for glass fiber having a decreased high temperature viscosity means that the 1000 poise temperature is lowered.

In the glass composition for glass fiber of the present embodiment, the content of ZnO with respect to the total amount of the glass composition for glass fiber is preferably in the range of 9.1 to 23.8% by mass, more preferably in the range of 9.5 to 23.4% by mass, still more preferably in the range of 10.1 to 23.0% by mass, markedly preferably in the range of 10.8 to 22.4% by mass, particularly preferably in the range of 11.0 to 21.0% by mass, especially preferably in the range of 11.5 to 19.9% by mass, remarkably preferably in the range of 12.1 to 19.0% by mass, and most preferably in the range of 13.0 to 17.9% by mass.

When the glass composition for glass fiber of the present embodiment has a content of MgO of more than 8.0% by mass with respect to the total amount of the glass composition for glass fiber, the coefficient of linear thermal expansion of the glass composition for glass fiber cannot be sufficiently reduced.

In the glass composition for glass fiber of the present embodiment, the content of MgO with respect to the total amount of the glass composition for glass fiber is preferably in the range of 7.5% by mass or less, more preferably in the range of 6.9% by mass or less, still more preferably in the range of 6.5% by mass or less, markedly preferably in the range of 5.9% by mass or less, particularly preferably in the range of 5.4% by mass or less, especially preferably in the range of 5.2% by mass or less, and most preferably in the range of 4.5% by mass or less. Furthermore, from the viewpoint of lowering the coefficient of linear thermal expansion of the glass composition for glass fiber, the content of MgO with respect to the total amount of the glass composition for glass fiber is preferably in the range of 1.9% by mass or less, more preferably in the range of 0.9% by mass or less, and still more preferably in the range of 0.4% by mass or less. Meanwhile, from the viewpoint of lowering the liquid phase temperature, the content of MgO with respect to the total amount of the glass composition for glass fiber is preferably in the range of 2.1% by mass or more, more preferably in the range of 2.6% by mass or more, and still more preferably in the range of 3.10% by mass or more.

When the glass composition for glass fiber of the present embodiment has a content of CaO of more than 5.0% by mass with respect to the total amount of the glass composition for glass fiber, the coefficient of linear thermal expansion of the glass composition for glass fiber cannot be sufficiently reduced.

In the glass composition for glass fiber of the present embodiment, the content of CaO with respect to the total amount of the glass composition for glass fiber is preferably in the range of 4.5% by mass or less, more preferably in the range of 3.9% by mass or less, still more preferably in the range of 3.5% by mass or less, markedly preferably in the range of 2.9% by mass or less, particularly preferably in the range of 2.4% by mass or less, especially preferably in the range of 1.9% by mass or less, remarkably preferably 1.5% by mass or less, and most preferably in the range of less than 0.1% by mass.

When the glass composition for glass fiber of the present embodiment has a content of $P_2O_5$ of more than 8.0% by mass with respect to the total amount of the glass composition for glass fiber, the elastic modulus of the glass composition for glass fiber cannot be maintained, or the coefficient of linear thermal expansion cannot be sufficiently reduced.

In the glass composition for glass fiber of the present embodiment, the content of $P_2O_5$ with respect to the total amount of the glass composition for glass fiber is preferably in the range of 7.5% by mass or less, more preferably in the range of 6.9% by mass or less, still more preferably in the range of 1.5 to 6.5% by mass, markedly preferably in the range of 2.0 to 6.0% by mass, particularly preferably in the range of 2.5 to 5.5% by mass, especially preferably in the range of 3.1 to 4.9% by mass, and most preferably in the range of 3.5 to 4.5% by mass.

When the glass composition for glass fiber of the present embodiment has a content of $TiO_2$ of more than 2.5% by mass with respect to the total amount of the glass composition for glass fiber, the liquid phase temperature of the glass composition for glass fiber rises or phase separation is promoted, making it difficult to perform spinning.

In the glass composition for glass fiber of the present embodiment, the content of $TiO_2$ with respect to the total amount of the glass composition for glass fiber is preferably in the range of 1.9% by mass or less, more preferably in the range of 1.7% by mass or less, still more preferably in the range of 1.4% by mass or less, markedly preferably in the range of 0.9% by mass or less, particularly preferably in the range of 0.7% by mass or less, especially preferably in the range of 0.4% by mass or less, and most preferably in the range of 0.1% by mass or less.

When the glass composition for glass fiber of the present embodiment has a total content of $Li_2O$, $Na_2O$, and $K_2O$ of 1.0% by mass or more with respect to the total amount of the glass composition for glass fiber, the coefficient of linear thermal expansion of the glass composition for glass fiber cannot be sufficiently reduced.

In the glass composition for glass fiber of the present embodiment, the total content of $Li_2O$, $Na_2O$, and $K_2O$ with respect to the total amount of the glass composition for glass fiber is preferably in the range of 0.8% by mass or less, more preferably in the range of 0.6% by mass or less, still more preferably in the range of 0.5% by mass or less, markedly preferably in the range of 0.4% by mass or less, particularly preferably in the range of 0.2% by mass or less, especially preferably in the range of 0.1% by mass or less, and most preferably in the range of 0.05% by mass or less.

In the glass composition for glass fiber of the present embodiment, as the total content of MgO and CaO is increased, the coefficient of linear thermal expansion of the glass composition for glass fiber is increased. Therefore, by replacing MgO and CaO with ZnO, which is a divalent metal oxide as well, the coefficient of linear thermal expansion of the glass composition for glass fiber can be lowered. (MgO+CaO)/ZnO (that is, (M+C)/Z) expresses the above situation, and when (MgO+CaO)/ZnO is more than 0.46, the coefficient of linear thermal expansion of the glass composition for glass fiber cannot be sufficiently lowered.

Here, the (MgO+CaO)/ZnO is preferably in the range of 0.43 or less, more preferably in the range of 0.40 or less, still more preferably in the range of 0.37 or less, markedly preferably in the range of 0.35 or less, particularly preferably in the range of 0.34 or less, especially preferably in the range of 0.33 or less, and most preferably in the range of 0.32 or less. Furthermore, from the viewpoint of lowering the coefficient of thermal expansion of glass fiber, it is preferably in the range of 0.15 or less, more preferably in the range of 0.09 or less, and still more preferably in the range of 0.03 or less. Meanwhile, from the viewpoint of lowering the liquid phase temperature, (MgO+CaO)/ZnO is preferably in the range of 0.11 or more, more preferably in the range of 0.15 or more, and still more preferably in the range of 0.25 or more.

Also, in the glass composition for glass fiber of the present embodiment, as the value of (S−P)×(A−P) is increased, it means that the contents of $SiO_2$ and $Al_2O_3$ in the glass fiber formed are increased, and the coefficient of linear thermal expansion can be lowered. On the other hand, as the value of (S−P)×(A−P) is increased, the liquid phase temperature of the glass composition for glass fiber is increased, and the spinnability is deteriorated. Also, as the content of $P_2O_5$ is increased, the generation of crystals from the molten glass can be suppressed, whereas the coefficient of linear thermal expansion tends to be increased compared to the cases of $SiO_2$ and $Al_2O_3$. Therefore, by adjusting the contents of $SiO_2$ and $Al_2O_3$ with $P_2O_5$, their effects can be adjusted. Thus, $\{(S-P)\times(A-P)\}^{1/2}$ is presumed to represent the balance between the liquid phase temperature of the glass composition for glass fiber and the coefficient of linear thermal expansion of the glass composition for glass fiber.

Then, the glass composition for glass fiber of the present embodiment includes $SiO_2$, $Al_2O_3$, ZnO, MgO, CaO, $P_2O_5$, $TiO_2$, $Li_2O$, $Na_2O$, and $K_2O$ in the ranges described above, and the S, A, and P preferably satisfy the following formula (1-2):

$$28.6 \leq \{(S-P)\times(A-P)\}^{1/2} \leq 33.8. \quad (1\text{-}2)$$

When the glass composition for glass fiber of the present embodiment includes $SiO_2$, $Al_2O_3$, ZnO, MgO, CaO, $P_2O_5$, $TiO_2$, $Li_2O$, $Na_2O$, and $K_2O$ in the ranges described above, and when the S, A, and P satisfy the above formula (1-2), the liquid phase temperature is lower, the coefficient of linear thermal expansion of the glass composition for glass fiber is lower, and the elastic modulus is E glass or more.

In addition, the glass composition for glass fiber of the present embodiment includes $SiO_2$, $Al_2O_3$, ZnO, MgO, CaO, $P_2O_5$, $TiO_2$, $Li_2O$, $Na_2O$, and $K_2O$ in the ranges described above, and the S, A, and P preferably satisfy the following formula (2-a), more preferably satisfy the following formula (2-P), and still more preferably satisfy the following formula (2-1):

$$P\times\{Z/(Z+C+M)\}\times(S/A) \leq 15.50 \quad (2\text{-}\alpha)$$

$$P\times\{Z/(Z+C+M)\}\times(S/A) \leq 12.20 \quad (2\text{-}\beta)$$

$$P\times\{Z/(Z+C+M)\}\times(S/A) \leq 10.72. \quad (2\text{-}1)$$

Also, in the glass composition for glass fiber of the present embodiment, as the P is increased, the liquid phase temperature is lower, whereas as the P is decreased, phase separation is less likely to occur. In addition, in the glass composition for glass fiber of the present embodiment, the Z/(Z+C+M) represents the content of ZnO with respect to the content of the divalent metal oxides. Among the divalent metal oxides, ZnO is particularly characterized in that it lowers the coefficient of linear thermal expansion of the glass composition for glass fiber, whereas it is less effective in suppressing the phase separation of the glass composition for glass fiber. As a result of this, as the Z/(Z+C+M) is increased, the coefficient of linear thermal expansion of the glass composition for glass fiber is lowered, and as the Z/(Z+C+M) is decreased, the glass composition for glass fiber is less susceptible to phase separation. Also, as S/A is increased, the glass composition for glass fiber is susceptible to phase separation, and as S/A is decreased, the liquid phase temperature of the glass composition for glass fiber is lowered.

From the above, P×{Z/(Z+C+M)}×(S/A) is presumed to represent the balance between the ease of phase separation and liquid phase temperature of the glass composition for glass fiber and the coefficient of linear thermal expansion of the glass composition for glass fiber.

Therefore, when the glass composition for glass fiber of the present embodiment includes $SiO_2$, $Al_2O_3$, ZnO, MgO, CaO, $P_2O_5$, $TiO_2$, $Li_2O$, $Na_2O$, and $K_2O$ in the ranges described above, and when the S, A, and P satisfy the above formula (2-1), the coefficient of linear thermal expansion of the glass composition for glass fiber is lower, and the elastic modulus is E glass or more. In the case where the glass composition for glass fiber of the present embodiment satisfies the above formula (2-1), the glass composition for glass fiber of the present embodiment preferably satisfies the above formula (1-2).

In addition, the glass composition for glass fiber of the present embodiment includes $SiO_2$, $Al_2O_3$, ZnO, MgO, CaO, $P_2O_5$, $TiO_2$, $Li_2O$, $Na_2O$, and $K_2O$ in the ranges described above, and the S, A, and P preferably satisfy the following formulas (1-3) and (2-2):

$$29.5 \le \{(S-P) \times (A-P)\}^{1/2} \le 31.2 \qquad (1-3)$$

$$7.15 \le P \times \{Z/(Z+C+M)\} \times (S/A) \le 10.40. \qquad (2-2)$$

When the glass composition for glass fiber of the present embodiment includes $SiO_2$, $Al_2O_3$, ZnO, MgO, CaO, $P_2O_5$, $TiO_2$, $Li_2O$, $Na_2O$, and $K_2O$ in the ranges described above, and when the S, A, and P satisfy the above formula (2-1), the liquid phase temperature is further lower, the coefficient of linear thermal expansion of the glass composition for glass fiber is further lower, and the elastic modulus is E glass or more.

Also, the glass composition for glass fiber of the present embodiment may include, for example, $Al_2O_3$ in the range of 20.5 to 25.0% by mass, and ZnO, MgO, and CaO in the range of 15.5 to 25.0% by mass in total, with respect to the total amount. In the glass composition for glass fiber of the present embodiment, in the case where the content of $Al_2O_3$ and the total content of ZnO, MgO, and CaO are in the ranges described above, the glass composition for glass fiber of the present embodiment preferably satisfies either the above formula (1-2) or the above formula (2-1), more preferably satisfies both the above formula (1-2) and the above formula (2-1), and still more preferably satisfies both the above formula (1-3) and the above formula (2-2).

In the glass composition for glass fiber of the present embodiment, the total content of ZnO, MgO, and CaO with respect to the total amount of the glass composition for glass fiber is preferably in the range of 15.5 to 25.0% by mass, more preferably in the range of 16.0 to 23.5% by mass, still more preferably in the range of 16.5 to 22.0% by mass, and particularly preferably in the range of 17.0 to 20.5% by mass.

The glass composition for glass fiber of the present embodiment may also include $B_2O_3$. In the glass composition for glass fiber of the present embodiment, the content of $B_2O_3$ with respect to the total amount of the glass composition for glass fiber is, for example, in the range of 10.0% by mass or less, preferably in the range of 8.0% by mass or less, more preferably in the range of 4.5% by mass or less, still more preferably in the range of 3.5% by mass or less, markedly preferably in the range of 2.9% by mass or less, particularly preferably in the range of 2.5% by mass or less, especially preferably in the range of 1.9% by mass or less, remarkably preferably in the range of 1.5% by mass or less, and most preferably in the range of less than 0.5% by mass.

Also, the glass composition for glass fiber of the present embodiment may include $ZrO_2$ in the range of 0.0 to 1.0% by mass with respect to the total amount of the glass composition for glass fiber.

In addition, in the glass composition for glass fiber of the present embodiment, the total content of $SiO_2$, $Al_2O_3$, ZnO, MgO, CaO, and $P_2O_5$ with respect to the total amount is, for example, in the range of 91.0% by mass or more, preferably in the range of 95.0% by mass or more, more preferably in the range of 98.0% by mass or more, still more preferably in the range of 99.0% by mass or more, markedly preferably in the range of 99.3% by mass or more, particularly preferably in the range of 99.5% by mass or more, especially preferably in the range of 99.7% by mass or more, and most preferably in the range of 99.9% by mass or more.

Further, the glass composition for glass fiber of the present embodiment may include, as impurities attributable to raw materials, oxides of Sr, Ba, Co, Ni, Cu, Mo, W, Ce, Y, La, Bi, Gd, Pr, Sc, or Yb in the range of less than 1.00% by mass in total with respect to the total amount of the glass composition for glass fiber. Particularly when the glass composition for glass fiber of the present embodiment includes SrO, BaO, $CeO_2$, $Y_2O_3$, $La_2O_3$, $Bi_2O_3$, $Gd_2O_3$, $Pr_2O_3$, $Sc_2O_3$, or $Yb_2O_3$ as impurities, the content of each of the impurities is independently preferably in the range of less than 0.40% by mass, more preferably in the range of less than 0.20% by mass, still more preferably in the range of less than 0.10% by mass, particularly preferably less than 0.05% by mass, and most preferably less than 0.01% by mass.

Regarding the content of each component in the glass composition for glass fiber, the content of Li as the light element can be measured using an ICP emission spectroscopic analyzer. Also, the contents of the other elements can be measured using a wavelength dispersive X-ray fluorescence analyzer.

Examples of the measurement method can include the following methods. First, a glass batch is placed in a platinum crucible and melted with stirring while being held at a temperature of 1650° C. for 6 hours in an electric furnace to obtain a homogeneous molten glass. Alternatively, glass fiber is placed in a platinum crucible and melted with stirring while being held at a temperature of 1650° C. for 6 hours in an electric furnace to obtain a homogeneous molten glass.

The glass batch is prepared by mixing a glass raw material. Also, in the case where organic matter adheres to the surface of the glass fiber, or in the case where glass fiber is mainly included as a reinforcing material in organic matter (resin), the glass fiber is used after the organic matter is removed by, for example, heating for about 0.5 to 24 hours in a muffle furnace at 300 to 650° C.

Next, the obtained molten glass is poured onto a carbon plate to produce a glass cullet, and then the glass cullet is pulverized and powdered to obtain glass powder.

Next, regarding Li as a light element, the glass powder is thermally decomposed with an acid and then quantitatively analyzed using an ICP emission spectroscopic analyzer. Regarding other elements, the glass powder is molded into a disc shape by a pressing machine and then quantitatively analyzed using a wavelength dispersive X-ray fluorescence analyzer. For the quantitative analysis using a wavelength dispersive X-ray fluorescence analyzer, specifically, specimens for calibration curve are prepared based on the measurement results from the fundamental parameter method, and the analysis can be performed by the calibration curve method. The content of each component in the specimens for calibration curve can be quantitatively analyzed by an ICP emission spectroscopic analyzer. These quantitative analysis results are converted in terms of oxides to calculate the content of each component and the total amount, and the above content (% by mass) of each component can be determined from these numerical values.

In the glass composition for glass fiber of the present embodiment, the elastic modulus of the glass composition for glass fiber, as measured by the method described later, is, for example, in the range of 75 GPa or more, preferably in the range of 80 GPa or more, more preferably in the range of 85 GPa or more, still more preferably in the range of 88 GPa or more, and particularly preferably in the range of 90 GPa or more. Also, the upper limit is not particularly restricted, but is, for example, in the range of 100 GPa or less.

In the glass composition for glass fiber of the present embodiment, the liquid phase temperature, as measured by the method described later, is, for example, in the range of 1520° C. or lower, preferably in the range of 1490° C. or lower, more preferably in the range of 1465° C. or lower, still more preferably in the range of 1450° C. or lower, and particularly preferably in the range of 1420° C. or lower. Also, the lower limit is not particularly restricted, but is, for example, in the range of 1350° C. or higher.

In the glass composition for glass fiber of the present embodiment, the coefficient of linear thermal expansion of the glass composition for glass fiber, as measured by the method described later, is, for example, in the range of $30 \times 10^{-7}$/K or less, more preferably in the range of $27 \times 10^{-7}$/K or less, still more preferably in the range of $24 \times 10^{-7}$/K or less, and particularly preferably in the range of $22 \times 10^{-7}$/K or less. Also, the lower limit is not particularly restricted, but is, for example, in the range of $16 \times 10^{-7}$/K or more.

The glass fiber of the present embodiment can be formed from the glass composition for glass fiber of the present embodiment, for example, as follows. First, a glass raw material prepared to have the above composition when melted is supplied to a melting furnace, and is melted at a temperature range of 1000 poise temperature or higher, specifically a temperature in the range of 1450 to 1650° C. The molten glass melted at the above temperature is then discharged from 1 to 8000 nozzle tips or holes controlled at a predetermined temperature and cooled while stretched by winding at high speed to be solidified into glass fiber.

Glass single fiber (glass filament) discharged from one nozzle tip or hole, cooled and solidified typically has a perfect circle cross-sectional shape and has a diameter in the range of 2.0 to 35.0 µm. On the other hand, when the above nozzle tip has a non-circular shape and has a protrusion or a notch for rapidly cooling the molten glass, controlling the temperature condition can provide a glass filament having a non-circular (for example, elliptical and long-oval) cross-sectional shape. When the glass filament has an elliptical or long-oval cross-sectional shape, the ratio of the major axis to the minor axis of the cross-sectional shape (major axis/minor axis) is, for example, in the range of 2.0 to 10.0 and the fiber diameter (converted fiber diameter) when the cross-sectional area is converted to a perfect circle is, for example, in the range of 2.0 to 35.0 µm.

Note that the glass fiber of the present embodiment typically has a shape of a glass fiber bundle (glass strand) in which the above glass filaments in the range of 10 to 8000 filaments are bundled, and has a weight in the range of 0.3 to 10000.0 tex (g/km).

The glass fiber of the present embodiment can have various forms, which are obtained by further processing the above glass strands, such as yarns, woven fabrics, knitted fabrics, non-woven fabrics (including chopped strand mats and multiaxial non-woven fabrics), chopped strands, rovings, and powders.

The glass fiber of the present embodiment may be coated with an organic matter on the surface thereof for the purposes such as improvement of glass filament convergence, improvement of adhesiveness between glass fiber and a resin, and improvement of uniform dispersibility of glass fiber in a mixture of glass fiber and resin or inorganic material. Examples of such an organic matter can include starch, urethane resins, epoxy resins, vinyl acetate resins, acrylic resins, modified polypropylene (particularly carboxylic acid-modified polypropylene), and a copolymer of (poly)carboxylic acid (particularly maleic acid) and an unsaturated monomer. The glass fiber of the present embodiment may be coated with the resin composition including a silane coupling agent, a lubricant, surfactant, and the like in addition to these resins. The glass fiber of the present embodiment may be coated with the treating agent composition not including the resins and including a silane coupling agent, surfactant, and the like. Such a resin composition or treating agent composition covers the glass fiber at a rate in the range of 0.1 to 2.0% by mass based on the mass of the glass fiber of the present embodiment in a state where it is not coated with the resin composition or the treating agent composition. The glass fiber can be coated with the organic matter by applying a resin solution or a resin composition solution to the glass fiber using a known method such as a roller applicator, for example, in the manufacturing process of the glass fiber and then drying the glass fiber to which the resin solution or the resin composition solution has been applied. The glass fiber of the present embodiment in the form of a woven fabric can be coated with the organic matter by immersing the glass fiber in the treating agent composition solution and then drying the glass fiber to which the treating agent composition has been applied.

Examples of the silane coupling agent can include aminosilanes, chlorosilanes, epoxysilanes, mercaptosilanes, vinylsilanes, acrylsilanes, and cationic silanes. As for the silane coupling agent, these compounds can be used alone, or two or more of them can be used in combination.

Examples of the aminosilane include γ-aminopropyltriethoxysilane, N-β-(aminoethyl)-γ-aminopropyltrimethoxysilane, N-β-(aminoethyl)-N'-β-(aminoethyl)-γ-aminopropyltrimethoxysilane, and γ-anilinopropyltrimethoxysilane.

Examples of the chlorosilane include γ-chloropropyltrimethoxysilane.

Examples of the epoxysilane include γ-glycidoxypropyltrimethoxysilane and β-(3,4-epoxycyclohexyl)ethyltrimethoxysilane.

Examples of the mercaptosilane can include γ-mercaptotrimethoxysilane.

Examples of the vinylsilane include vinyl trimethoxysilane and N-Q-(N-vinylbenzylaminoethyl)-γ-aminopropyltrimethoxysilane.

Examples of the acrylsilane include γ-methacryloxypropyltrimethoxysilane.

Examples of the cationic silane can include N-(vinylbenzyl)-2-aminoethyl-3-aminopropyltrimethoxysilane hydrochloride and N-phenyl-3-aminopropyltrimethoxysilane hydrochloride.

Examples of the lubricant include modified silicone oils, animal oils and hydrogenated products thereof, vegetable oils and hydrogenated products thereof, animal waxes, vegetable waxes, mineral waxes, condensates of a higher saturated fatty acid and a higher saturated alcohol, polyethyleneimine, polyalkylpolyamine alkylamide derivatives, fatty acid amides, and quaternary ammonium salts. As for the lubricant, these can be used alone, or two or more of them can be used in combination.

Examples of the animal oil include beef tallow.

Examples of the vegetable oil include soybean oil, coconut oil, rapeseed oil, palm oil, and castor oil.

Examples of the animal wax include beeswax and lanolin.

Examples of the vegetable wax include candelilla wax and carnauba wax.

Examples of the mineral wax include paraffin wax and montan wax.

Examples of the condensate of a higher saturated fatty acid and a higher saturated alcohol include stearates such as lauryl stearate.

Examples of the fatty acid amide include dehydrated condensates of a polyethylenepolyamine such as diethylenetriamine, triethylenetetramine, or tetraethylenepentamine and a fatty acid such as lauric acid, myristic acid, palmitic acid, or stearic acid.

Examples of the quaternary ammonium salt include alkyltrimethylammonium salts such as lauryltrimethylammonium chloride.

Examples of the surfactant can include nonionic surfactants, cationic surfactants, anionic surfactants, and amphoteric surfactants. As for the surfactant, these can be used alone, or two or more of them can be used in combination.

Examples of the nonionic surfactant can include ethylene oxide propylene oxide alkyl ether, polyoxyethylene alkyl ether, polyoxyethylene-polyoxypropylene-block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adduct, polyoxyethylene castor oil ether, hydrogenated castor oil ethylene oxide adduct, alkylamine ethylene oxide adduct, fatty acid amide ethylene oxide adduct, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of the cationic surfactant can include alkyldimethylbenzylammonium chloride, alkyltrimethylammonium chloride, alkyl dimethyl ethyl ammonium ethyl sulfate, higher alkylamine acetate, higher alkylamine hydrochloride, adduct of ethylene oxide to a higher alkylamine, condensate of a higher fatty acid and polyalkylene polyamine, a salt of an ester of a higher fatty acid and alkanolamine, a salt of higher fatty acid amide, imidazoline cationic surfactant, and alkyl pyridinium salt.

Examples of the anionic surfactant can include higher alcohol sulfate salts, higher alkyl ether sulfate salts, α-olefin sulfate salts, alkylbenzene sulfonate salts, α-olefin sulfonate salts, reaction products of fatty acid halide and N-methyl taurine, dialkyl sulfosuccinate ester salts, higher alcohol phosphate ester salts, and phosphate ester salts of higher alcohol ethylene oxide adduct. Examples of the amphoteric surfactant can include amino acid amphoteric surfactants such as alkali metal salts of alkylaminopropionic acid, betaine amphoteric surfactants such as alkyldimethylbetaine, and imidazoline amphoteric surfactants.

The glass fiber woven fabric of the present embodiment includes the above glass fiber of the present embodiment. Specifically, the glass fiber woven fabric of the present embodiment can be obtained by weaving the above glass fiber of the present embodiment as at least a part of warp yarns or weft yarns with a loom known per se. Examples of the loom may include jet looms such as air jet or water jet looms, shuttle looms, and rapier looms. Examples of weaving with the loom can include plain weaving, satin weaving, mat weaving, and twill weaving; however, from the viewpoint of production efficiency, plain weaving is preferred.

In the glass fiber woven fabric of the present embodiment, the above glass fiber of the present embodiment is preferably formed by bundling glass filaments in the range of 35 to 400 filaments, each having a diameter in the range of 3.0 to 9.0 μm, has a number of twists in the range of 0 to 1.0 twist/25 mm, and has a mass in the range of 0.9 to 69.0 tex (g/km).

In the glass fiber woven fabric of the present embodiment, in the case where the above glass fiber of the present embodiment is employed as warp yarns or weft yarns, the warp yarn weaving density is preferably in the range of 40 to 120 yarns/25 mm, and the weft yarn weaving density is preferably in the range of 40 to 120 yarns/25 mm.

The glass fiber woven fabric of the present embodiment, after woven, may be subjected to desizing treatment, surface treatment, and opening treatment.

An example of the desizing treatment can be a treatment including placing the glass fiber woven fabric in a heating oven in which the atmosphere temperature is a temperature in the range of 350° C. to 400° C. for a time period in the range of 40 to 80 hours to thereby pyrolytically decompose organic matter adhering to the glass fiber.

An example of the surface treatment can be a treatment including immersing the glass fiber woven fabric in a solution including the silane coupling agent or including the silane coupling agent and the surfactant, squeezing extra water therefrom, and heat-drying the woven fabric at a temperature in the range of 80 to 180° C. for a time period in the range of 1 to 30 minutes.

An example of the opening treatment is a treatment in which the warp yarns of the glass fiber woven fabric are subjected to opening by means of water flow pressure, opening by means of high-frequency vibration using a liquid as a medium, opening by means of the pressure of a fluid having a surface pressure, opening by means of pressing with a roll, or the like under a tension in the range of 30 to 200 N to thereby widen the width of the warp yarns and weft yarns.

The glass fiber woven fabric of the present embodiment has a mass per unit area in the range of 7.0 to 190.0 g/m² and preferably has a thickness in the range of 8.0 to 200.0 μm.

The yarn width of the warp yarns of the glass fiber woven fabric of the present embodiment is preferably in the range of 110 to 600 μm and the yarn width of the weft yarns thereof is preferably in the range of 110 to 600 μm.

The glass fiber woven fabric of the present embodiment may comprise a surface treatment layer including the silane coupling agent or the silane coupling agent and the surfactant. When the glass fiber woven fabric of the present embodiment includes the surface treatment layer, the surface treatment layer can have a mass in the range of 0.03 to 1.50% by mass, for example, with respect to the total amount of the glass fiber woven fabric including the surface treatment layer.

The glass fiber-reinforced resin composition of the present embodiment includes the above glass fiber of the present embodiment. Specifically, the glass fiber-reinforced resin composition of the present embodiment includes 10 to 90% by mass of glass fiber with respect to the total amount of the glass fiber-reinforced resin composition, as the glass fiber-reinforced resin composition including resin (thermoplastic resin or thermosetting resin), glass fiber, and other additives. Also, the glass fiber-reinforced resin composition of the present embodiment includes 90 to 10% by mass of a resin, and includes other additives in the range of 0 to 40% by mass with respect to the total amount of the glass fiber-reinforced resin composition.

Examples of the thermoplastic resin that forms the glass fiber-reinforced resin composition of the present embodiment can include the following: polyethylene, polypropylene, polystyrene, styrene/maleic anhydride resins, styrene/maleimide resins, polyacrylonitrile, acrylonitrile/styrene (AS) resins, acrylonitrile/butadiene/styrene (ABS) resins, chlorinated polyethylene/acrylonitrile/styrene (ACS) resins, acrylonitrile/ethylene/styrene (AES) resins, acrylonitrile/styrene/methyl acrylate (ASA) resins, styrene/acrylonitrile (SAN) resins, methacrylic resins, polyvinyl chloride (PVC), polyvinylidene chloride (PVDC), polyamide, polyacetal, polyethylene terephthalate (PET), polybutylene terephthalate (PBT), polytrimethylene terephthalate (PTT), polycarbonate, polyarylene sulfide, polyethersulfone (PES), polyphenylsulfone (PPSU), polyphenylene ether (PPE), modified polyphenylene ether (m-PPE), polyaryl etherketone, liquid crystal polymer (LCP), fluororesins, polyetherimide (PEI), polyarylate (PAR), polysulfone (PSF), polyamideimide (PAI), polyaminobismaleimide (PABM), thermoplastic polyimide (TPI), polyethylene naphthalate (PEN), ethylene/vinyl acetate (EVA) resins, ionomer (IO) resins, polybutadiene, styrene/butadiene resins, polybutylene, polymethylpentene, olefin/vinyl alcohol resins, cyclic olefin resins, cellulose resins, and polylactic acid.

Examples of the polyethylene can include high density polyethylene (HDPE), medium density polyethylene, low density polyethylene (LDPE), linear low density polyethylene (LLDPE), and ultra high molecular weight polyethylene.

Examples of the polypropylene can include isotactic polypropylene, atactic polypropylene, syndiotactic polypropylene, and mixtures thereof.

Examples of the polystyrene can include general-purpose polystyrene (GPPS), which is an atactic polystyrene having an atactic structure, high impact polystyrene (HIPS) with a rubber component added to GPPS, and syndiotactic polystyrene with syndiotactic structure.

Examples of the methacrylic resin can include polymers obtained by homopolymerizing one of acrylic acid, methacrylic acid, styrene, methyl acrylate, ethyl acrylate, ethyl methacrylate, butyl acrylate, butyl methacrylate, and fatty acid vinyl ester, or polymers obtained by copolymerizing two or more of these.

Examples of the polyvinyl chloride can include a vinyl chloride homopolymer, a copolymer of a vinyl chloride monomer and a copolymerizable monomer, or a graft copolymer obtained by graft polymerization of a vinyl chloride monomer to polymer polymerized by a conventionally known method such as emulsion polymerization method, suspension polymerization method, micro suspension polymerization method, or bulk polymerization method.

Examples of the polyamide can include one of the components such as polycaproamide (polyamide 6), polyhexamethylene adipamide (polyamide 66), polytetramethylene adipamide (polyamide 46), polytetramethylene sebacamide (polyamide 410), polypentamethylene adipamide (polyamide 56), polypentamethylene sebacamide (polyamide 510), polyhexamethylene sebacamide (polyamide 610), polyhexamethylene dodecamide (polyamide 612), polydecamethylene adipamide (polyamide 106), polydecamethylene sebacamide (polyamide 1010), polydecamethylene dodecamide (polyamide 1012), polyundecanamide (polyamide 11), polyundecamethylene adipamide (polyamide 116), polydodecanamide (polyamide 12), polyxylene adipamide (polyamide XD6), polyxylene sebacamide (polyamide XD10), polymetaxylylene adipamide (polyamide MXD6), polyparaxylylene adipamide (polyamide PXD6), polytetramethylene terephthalamide (polyamide 4T), polypentamethylene terephthalamide (polyamide 5T), polyhexamethylene terephthalamide (polyamide 6T), polyhexamethylene isophthalamide (polyamide 6I), polynonamethylene terephthalamide (polyamide 9T), polydecamethylene terephthalamide (polyamide 10T), polyundecamethylene terephthalamide (polyamide 11T), polydodecamethylene terephthalamide (polyamide 12T), polytetramethylene isophthalamide (polyamide 4I), polybis (3-methyl-4-aminohexyl) methane terephthalamide (polyamide PACMT), polybis(3-methyl-4-aminohexyl) methane isophthalamide (polyamide PACMI), polybis(3-methyl-4-aminohexyl) methane dodecamide (polyamide PACM12), and polybis(3-methyl-4-aminohexyl) methane tetradecamide (polyamide PACM14), or copolymers in which two or more multiple components are combined, or mixtures thereof.

Examples of the polyacetal can include a homopolymer with oxymethylene units as the main repeating unit, and a copolymer mainly consisting of oxymethylene units and containing oxyalkylene units having 2 to 8 adjacent carbon atoms in the main chain.

Examples of the polyethylene terephthalate can include a polymer obtained by polycondensation of terephthalic acid or a derivative thereof with ethylene glycol.

Examples of the polybutylene terephthalate can include a polymer obtained by polycondensation of terephthalic acid or a derivative thereof with 1,4-butanediol.

Examples of the polytrimethylene terephthalate can include polymers obtained by polycondensation of terephthalic acid or a derivative thereof with 1,3-propanediol.

Examples of the polycarbonate can include polymers obtained by a transesterification method in which a dihydroxydiaryl compound is reacted with a carbonate such as diphenyl carbonate in a molten state; or polymers obtained by phosgene method in which a dihydroxyaryl compound is reacted with phosgene.

Examples of the polyarylene sulfide can include linear polyphenylene sulfide, cross linked polyphenylene sulfide having a high molecular weight obtained by performing a curing reaction after polymerization, polyphenylene sulfide sulfone, polyphenylene sulfide ether, and polyphenylene sulfide ketone.

Examples of the modified polyphenylene ether can include: a polymer alloy of poly(2,6-dimethyl-1,4-phenylene)ether and polystyrene; a polymer alloy of poly(2,6-dimethyl-1,4-phenylene)ether and a styrene/butadiene copolymer; a polymer alloy of poly(2,6-dimethyl-1,4-phenylene) ether and a styrene/maleic anhydride copolymer; a polymer alloy of poly(2,6-dimethyl-1,4-phenylene)ether and polyamide; and a polymer alloy of poly(2,6-dimethyl-1,4-phenylene)ether and styrene/butadiene/acrylonitrile copolymer.

Examples of the polyaryl etherketone can include polyetherketone (PEK), polyetheretherketone (PEEK), polyetherketoneketone (PEKK), and polyetheretherketoneketone (PEEKK).

Examples of the liquid crystal polymer (LCP) include a polymer (copolymer) consisting of one or more structural units selected from aromatic hydroxycarbonyl units which are thermotropic liquid crystal polyesters, aromatic dihydroxy units, aromatic dicarbonyl units, aliphatic dihydroxy units, aliphatic dicarbonyl units, and the like.

Examples of the fluororesin can include polytetrafluoroethylene (PTFE), perfluoroalkoxy resins (PFA), fluorinated ethylene propylene resins (FEP), fluorinated ethylene tetrafluoroethylene resins (ETFE), polyvinyl fluoride (PVF), polyvinylidene fluoride (PVDF), polychlorotrifluoroethylene (PCTFE), and ethylene/chlorotrifluoroethylene resin (ECTFE).

Examples of the ionomer (IO) resin can include copolymers of an olefin or a styrene and an unsaturated carboxylic acid, wherein a part of carboxyl groups is neutralized with a metal ion.

Examples of the olefin/vinyl alcohol resin can include ethylene/vinyl alcohol copolymers, propylene/vinyl alcohol copolymers, saponified products of ethylene/vinyl acetate copolymers, and saponified products of propylene/vinyl acetate copolymers.

Examples of the cyclic olefin resin can include monocyclic compounds such as cyclohexene, polycyclic compounds such as tetracyclopentadiene, and polymers of cyclic olefin monomers.

Examples of the polylactic acid can include poly-L-lactic acid which is a homopolymer of L-form, poly-D-lactic acid which is a homopolymer of D-form, or a stereocomplex polylactic acid which is a mixture thereof.

Examples of the cellulose resin can include methylcellulose, ethyl cellulose, hydroxycellulose, hydroxymethylcellulose, hydroxyethyl cellulose, hydroxyethyl methylcellulose, hydroxypropylmethylcellulose, cellulose acetate, cellulose propionate, and cellulose butyrate. Examples of the above thermosetting resin that forms the glass fiber-reinforced resin composition of the present embodiment can include unsaturated polyester resins, vinyl ester resins, epoxy (EP) resins, melamine (MF) resins, phenol resins (PF), urethane resins (PU), polyisocyanate, polyisocyanurate, polyimide (PI), urea (UF) resins, silicone (SI) resins, furan (FR) resins, benzoguanamine (BR) resins, alkyd resins, xylene resins, bismaleimide triazine (BT) resins, and diallyl phthalate resin (PDAP).

Specific examples of the unsaturated polyester resin can include resin which can be obtained by esterification reaction of aliphatic unsaturated dicarboxylic acid and aliphatic diol.

Examples of the vinyl ester resin can include bis vinyl ester resins and novolac vinyl ester resins.

Examples of the epoxy resin can include bisphenol A epoxy resins, bisphenol F epoxy resins, bisphenol E epoxy resins, bisphenol S epoxy resins, bisphenol M epoxy resins (4,4'-(1,3-phenylenediisopropylidene)bisphenol epoxy resins), bisphenol P epoxy resins (4,4'-(1,4-phenylenediisopropylidene)bisphenol epoxy resins), bisphenol Z epoxy resins (4,4'-cyclohexylidne bisphenol epoxy resins), phenol novolac epoxy resins, cresol novolac epoxy resins, tetraphenol group ethane novolac type epoxy resins, novolac epoxy resins having a condensed ring aromatic hydrocarbon structure, biphenyl epoxy resins, aralkyl epoxy resins such as xylylene epoxy resins and phenyl aralkyl epoxy resins, naphthylene ether epoxy resins, naphthol epoxy resins, naphthalene diol epoxy resins, bifunctional or tetrafunctional epoxy naphthalene resins, binaphthyl epoxy resins, naphthalene aralkyl epoxy resins, anthracene epoxy resins, phenoxy epoxy resins, dicyclopentadiene epoxy resins, norbornene epoxy resins, adamantane epoxy resins, and fluorene epoxy resins.

Examples of the melamine resin can include a polymer formed by polycondensation of melamine (2,4,6-triamino-1,3,5-triazine) and formaldehyde.

Examples of the phenolic resin can include novolac phenolic resins such as phenol novolac resins, cresol novolac resins, and bisphenol A novolac resins, resol phenol resins such as methylol resole resins and dimethylene ether resole resins, or aryl alkylene phenol resins, and include one of these or combinations of two or more.

Examples of the urea resin can include a resin obtained by condensation of urea and formaldehyde.

The above thermoplastic resin or the above thermosetting resin may be used singly or in combinations of two or more.

Examples of the above other additives can include reinforcing fiber other than glass fiber (for example, carbon fiber, metal fiber), a filler other than glass fiber (for example, glass powder, talc, mica), a flame retardant, an UV absorber, a heat stabilizer, an antioxidant, an antistatic agent, a fluidity improver, an anti-blocking agent, a lubricant, a nucleating agent, an antibacterial agent, and a pigment.

The glass fiber-reinforced resin composition of the present embodiment can be obtained, for example, by kneading the chopped strands and the resin in a twin screw kneader and performing injection molding using the obtained resin pellets.

Also, the glass fiber-reinforced resin composition may be one obtained by using known molding methods such as injection compression molding method, two-color molding method, hollow molding method, foam molding method (including supercritical fluid foam molding method), insert molding method, in-mold coating molding method, extrusion molding method, sheet molding method, thermoforming method, rotational molding method, laminate molding method, press molding method, blow molding method, stamping molding method, infusion method, hand lay-up method, spray-up method, resin transfer molding method, sheet molding compound method, bulk molding compound method, pultrusion method, and filament winding method.

Also, the glass fiber-reinforced resin composition of the present embodiment may be prepreg obtained by impregnating the glass fiber woven fabric of the present embodiment with the resin by a known method per se and semi-curing the woven fabric.

Examples of applications of such molded products can include electronic device housing, electronic components, vehicle exterior members, vehicle interior members, vehicle engine members, muffler members, high pressure tanks, and composite materials for wind energy.

Examples of the electronic components include printed wiring boards.

Examples of the vehicle exterior members include bumpers, fenders, bonnets, air dams, and wheel covers.

Examples of the vehicle interior members include door trims and ceiling materials.

Examples of the vehicle engine members include oil pans, engine covers, intake manifolds, and exhaust manifolds.

Examples of the muffler members include silencers.

Examples of the composite materials for wind energy can include wind turbine blades.

The glass fiber of the present embodiment can be suitably used as a reinforcing material for inorganic materials such as gypsum and cement, in addition to the glass fiber-reinforced resin composition of the present embodiment. For example, when used as a reinforcing material for gypsum, especially, gypsum board having a thickness in the range of 4 to 60 mm, the glass fiber comprising the glass composition in the above range can be included in a range of 0.1 to 4.0% by mass with respect to the total mass of gypsum.

Examples and Comparative Examples of the present invention will be shown.

EXAMPLES

Examples 1 to 12 and Comparative Examples 1 to 6

A glass raw material was mixed to obtain a glass batch so that the glass composition after melt-solidification was the same as the composition of the respective glass compositions for glass fiber of Examples 1 to 12 or Comparative Examples 1 to 6 shown in Tables 1 to 3. Next, for the respective glass batches, evaluation of crystallization was conducted using the evaluation method described later. The results are shown in Tables 1 to 3.

Next, the glass batch corresponding to the glass composition for glass fiber of Examples 1 to 12 or Comparative Examples 1 to 6 was placed in an 80 mm diameter platinum crucible, melted by heating at a temperature of 1650° C. for 6 hours, and then taken out of the platinum crucible to obtain homogeneous glass bulk or glass cullet. The obtained glass bulk or glass cullet was then annealed by heating at a temperature of 750° C. for 8 hours to obtain a test piece. Next, for the respective test pieces, evaluation of phase separation was conducted by the evaluation method described later, and the elastic modulus, liquid phase temperature, and coefficient of linear thermal expansion were measured by the measurement methods described later. The results are shown in Tables 1 to 3.

Note that, for Comparative Example 3, the elastic modulus, liquid phase temperature, and coefficient of linear thermal expansion were not measured since crystals were generated in the glass immediately after the glass bulk or glass cullet was taken out of the crucible, and the glass bulk or glass cullet was not homogeneous.

[Evaluation Method of Crystallization]

The glass batch is placed in an 80 mm diameter platinum crucible, and melted to form molten glass by heating in a muffle furnace at a temperature of 1650° C. for 6 hours. Thereafter, the platinum crucible is taken out of the muffle furnace and allowed to be air cooled to room temperature. Evaluation is given as "O" when no crystal precipitation is observed on the surface or inside of the glass within the time until the molten glass is solidified, and "x" when crystal precipitation is visibly observed.

[Evaluation Method of Phase Separation]

A test piece that has been processed into a disc shape is placed on the boundary between a black plate and a white plate, and the boundary surface between the black plate and the white plate is observed through the test piece from the top of the test piece. Evaluation is given as "O" in the case where there is no cloudiness (phase separation) in the test piece and the boundary surface can be clearly observed, and "x" in the case where there is cloudiness in the test piece and the boundary surface cannot be clearly observed.

[Measurement Method of Elastic Modulus]

A test piece is processed into a test piece of 50 mm×50 mm×5 mm using a cutting machine such as diamond cutter and a polisher, and the elastic modulus is measured by the ultrasonic pulse method according to JIS R 1602:1995.

[Measurement Method of Liquid Phase Temperature]

Glass cullet is pulverized to glass particles with a particle diameter in the range of 0.5 to 1.5 mm, 40 g of the glass particles is placed in a platinum boat of 180 mm×20 mm×15 mm and heated in a tubular electric furnace provided with a temperature gradient of 1000 to 1550° C. for 8 hours or longer, then taken out of the tubular electric furnace, and observed with a polarized light microscope to identify the point at which crystals derived from glass (devitrification) began to precipitate. Next, the temperature inside the tubular electric furnace is actually measured using a type B thermocouple to determine the temperature of the point at which the crystals began to precipitate, which temperature is defined as the liquid phase temperature.

[Measurement Method of Coefficient of Linear Thermal Expansion]

A test piece is processed into a test piece of 4 mm×4 mm×20 mm using a cutting machine such as diamond cutter and a polisher. Next, the obtained test piece is heated at a temperature increase rate of 10° C./min, and the amount of elongation is measured using a coefficient of thermal expansion measuring apparatus (manufactured by NETZSCH, trade name: DIL 402) at a temperature in the range of 50 to 200° C. By calculating the coefficient of linear thermal expansion from the amount of elongation, the coefficient of linear thermal expansion of the glass composition for glass fiber is measured.

TABLE 1

|  | Example 1 | Example 2 | Example 3 | Example 4 | Example 5 | Example 6 |
|---|---|---|---|---|---|---|
| $SiO_2$ (% by mass) | 56.0 | 56.0 | 61.0 | 56.0 | 51.0 | 56.0 |
| $Al_2O_3$ (% by mass) | 22.5 | 22.5 | 20.0 | 20.0 | 25.0 | 25.0 |
| ZnO (% by mass) | 17.5 | 13.5 | 11.0 | 16.0 | 16.0 | 11.0 |
| MgO (% by mass) | 0.0 | 4.0 | 4.0 | 4.0 | 4.0 | 4.0 |
| CaO (% by mass) | 0.0 | 0.0 | 0.0 | 0.0 | 0.0 | 0.0 |
| $P_2O_5$ (% by mass) | 4.0 | 4.0 | 4.0 | 4.0 | 4.0 | 4.0 |
| $TiO_2$ (% by mass) | 0.0 | 0.0 | 0.0 | 0.0 | 0.0 | 0.0 |
| $B_2O_3$ (% by mass) | 0.0 | 0.0 | 0.0 | 0.0 | 0.0 | 0.0 |
| $Li_2O$ (% by mass) | 0.0 | 0.0 | 0.0 | 0.0 | 0.0 | 0.0 |
| $Na_2O$ (% by mass) | 0.0 | 0.0 | 0.0 | 0.0 | 0.0 | 0.0 |
| $K_2O$ (% by mass) | 0.0 | 0.0 | 0.0 | 0.0 | 0.0 | 0.0 |
| CaO + MgO (% by mass) | 0.0 | 4.0 | 4.0 | 4.0 | 4.0 | 4.0 |
| ZnO + MgO + CaO (% by mass) | 17.5 | 17.5 | 15.0 | 20.0 | 20.0 | 15.0 |
| $Li_2O + Na_2O + K_2O$ (% by mass) | 0.0 | 0.0 | 0.0 | 0.0 | 0.0 | 0.0 |
| Total | 100.0 | 100.0 | 100.0 | 100.0 | 100.0 | 100.0 |
| (MgO + CaO)/ZnO | 0.00 | 0.30 | 0.36 | 0.25 | 0.25 | 0.36 |
| $\{(SiO_2 - P_2O_5) \times (Al_2O_3 - P_2O_5)\}^{1/2}$ | 31.0 | 31.0 | 30.2 | 28.8 | 31.4 | 33.0 |
| $P_2O_5 \times \{ZnO/(ZnO + MgO + CaO)\} \times (SiO_2/Al_2O_3)$ | 9.96 | 7.68 | 8.95 | 8.96 | 6.53 | 6.57 |
| Crystallization | o | o | o | o | o | o |
| Phase separation | o | o | o | o | o | o |

TABLE 1-continued

|  | Example 1 | Example 2 | Example 3 | Example 4 | Example 5 | Example 6 |
|---|---|---|---|---|---|---|
| Elastic modulus (GPa) | 89 | 91 | 88 | 90 | 94 | 92 |
| Liquid phase temperature (° C.) | 1453 | 1402 | 1462 | 1448 | 1485 | 1469 |
| Coefficient of linear thermal expansion ($10^{-7}$/K) | 21 | 24 | 24 | 27 | 26 | 25 |

TABLE 2

|  | Example 7 | Example 8 | Example 9 | Example 10 | Example 11 | Example 12 |
|---|---|---|---|---|---|---|
| $SiO_2$ (% by mass) | 60.0 | 55.3 | 57.3 | 65.0 | 60.0 | 56.0 |
| $Al_2O_3$ (% by mass) | 20.0 | 21.7 | 21.8 | 20.0 | 22.5 | 19.5 |
| ZnO (% by mass) | 20.0 | 23.0 | 20.9 | 15.0 | 17.5 | 20.5 |
| MgO (% by mass) | 0.0 | 0.0 | 0.0 | 0.0 | 0.0 | 0.0 |
| CaO (% by mass) | 0.0 | 0.0 | 0.0 | 0.0 | 0.0 | 0.0 |
| $P_2O_5$ (% by mass) | 0.0 | 0.0 | 0.0 | 0.0 | 0.0 | 4.0 |
| $TiO_2$ (% by mass) | 0.0 | 0.0 | 0.0 | 0.0 | 0.0 | 0.0 |
| $B_2O_3$ (% by mass) | 0.0 | 0.0 | 0.0 | 0.0 | 0.0 | 0.0 |
| $Li_2O$ (% by mass) | 0.0 | 0.0 | 0.0 | 0.0 | 0.0 | 0.0 |
| $Na_2O$ (% by mass) | 0.0 | 0.0 | 0.0 | 0.0 | 0.0 | 0.0 |
| $K_2O$ (% by mass) | 0.0 | 0.0 | 0.0 | 0.0 | 0.0 | 0.0 |
| CaO + MgO (% by mass) | 0.0 | 0.0 | 0.0 | 0.0 | 0.0 | 0.0 |
| ZnO + MgO + CaO (% by mass) | 20.0 | 23.0 | 20.9 | 15.0 | 17.5 | 20.5 |
| $Li_2O + Na_2O + K_2O$ (% by mass) | 0.0 | 0.0 | 0.0 | 0.0 | 0.0 | 0.0 |
| Total | 100.0 | 100.0 | 100.0 | 100.0 | 100.0 | 100.0 |
| (MgO + CaO)/ZnO | 0.00 | 0.00 | 0.00 | 0.00 | 0.00 | 0.00 |
| $\{(SiO_2 - P_2O_5) \times (Al_2O_3 - P_2O_5)\}^{1/2}$ | 34.6 | 34.6 | 35.3 | 36.1 | 36.7 | 28.4 |
| $P_2O_5 \times \{ZnO/(ZnO + MgO + CaO)\} \times (SiO_2/Al_2O_3)$ | 0.00 | 0.00 | 0.00 | 0.00 | 0.00 | 11.49 |
| Crystallization | ○ | ○ | ○ | ○ | ○ | ○ |
| Phase separation | ○ | ○ | ○ | ○ | ○ | ○ |
| Elastic modulus (GPa) | 90 | 93 | 92 | 88 | 92 | 87 |
| Liquid phase temperature (° C.) | 1491 | 1507 | 1510 | 1497 | 1515 | 1446 |
| Coefficient of linear thermal expansion ($10^{-7}$/K) | 21 | 24 | 23 | 20 | 22 | 22 |

TABLE 3

|  | Comparative Example 1 | Comparative Example 2 | Comparative Example 3 | Comparative Example 4 | Comparative Example 5 | Comparative Example 6 |
|---|---|---|---|---|---|---|
| $SiO_2$ (% by mass) | 55.0 | 60.0 | 68.7 | 54.5 | 57.0 | 53.3 |
| $Al_2O_3$ (% by mass) | 25.0 | 25.0 | 11.0 | 24.3 | 21.5 | 21.4 |
| ZnO (% by mass) | 20.0 | 15.0 | 10.6 | 13.5 | 16.5 | 12.8 |
| MgO (% by mass) | 0.0 | 0.0 | 2.7 | 6.5 | 0.0 | 3.7 |
| CaO (% by mass) | 0.0 | 0.0 | 0.0 | 1.0 | 0.0 | 0.0 |
| $P_2O_5$ (% by mass) | 0.0 | 0.0 | 0.0 | 0.0 | 0.0 | 3.8 |
| $TiO_2$ (% by mass) | 0.0 | 0.0 | 4.8 | 0.0 | 5.0 | 5.0 |
| $B_2O_3$ (% by mass) | 0.0 | 0.0 | 2.2 | 0.0 | 0.0 | 0.0 |
| $Li_2O$ (% by mass) | 0.0 | 0.0 | 0.0 | 0.2 | 0.0 | 0.0 |
| $Na_2O$ (% by mass) | 0.0 | 0.0 | 0.0 | 0.0 | 0.0 | 0.0 |
| $K_2O$ (% by mass) | 0.0 | 0.0 | 0.0 | 0.0 | 0.0 | 0.0 |
| CaO + MgO (% by mass) | 0.0 | 0.0 | 2.7 | 7.5 | 0.0 | 3.7 |
| ZnO + MgO + CaO (% by mass) | 20.0 | 15.0 | 13.3 | 21.0 | 16.5 | 16.5 |
| $Li_2O + Na_2O + K_2O$ (% by mass) | 0.0 | 0.0 | 0.0 | 0.2 | 0.0 | 0.0 |
| Total | 100.0 | 100.0 | 100.0 | 100.0 | 100.0 | 100.0 |
| (MgO + CaO)/ZnO | 0.00 | 0.00 | 0.25 | 0.56 | 0.00 | 0.29 |
| $\{(SiO_2 - P_2O_5) \times (Al_2O_3 - P_2O_5)\}^{1/2}$ | 37.1 | 38.7 | 27.5 | 36.4 | 35.0 | 29.5 |
| $P_2O_5 \times \{ZnO/(ZnO + MgO + CaO)\} \times (SiO_2/Al_2O_3)$ | 0.00 | 0.00 | 0.00 | 0.00 | 0.00 | 7.34 |
| Crystallization | ○ | ○ | x | ○ | ○ | ○ |
| Phase separation | ○ | ○ | ○ | ○ | x | x |
| Elastic modulus (GPa) | 94 | 93 | Not measurable due to occurrence of crystallization | 98 | — | — |
| Liquid phase temperature (° C.) | >1520 | >1520 |  | 1494 | — | — |
| Coefficient of linear thermal expansion ($10^{-7}$/K) | 24 | 21 |  | 32 | — | — |

From Tables 1 and 2, according to the glass compositions for glass fiber of Examples 1 to 12, it is clear that glass fiber with a low liquid phase temperature, a slow crystallization rate, suppressed phase separation, a low coefficient of linear thermal expansion, and a high elastic modulus can be formed in which no crystallization and phase separation are observed, the elastic modulus is 75 GPa or more, the liquid phase temperature is 1515° C. or lower, and the coefficient of linear thermal expansion is 27×$10^{-7}$/K or less.

On the other hand, from Table 3, it is clear that, according to the glass compositions for glass fiber of Comparative Examples 1 and 2, the liquid phase temperature is as high as 1520° C. or higher, according to the glass composition for glass fiber of Comparative Example 3, the crystallization rate is fast, according to the glass composition for glass fiber of Comparative Example 4, the coefficient of linear thermal expansion is as high as $30 \times 10^{-7}$/K or more, and according to the glass compositions for glass fiber of Comparative Examples 5 and 6, phase separation cannot be suppressed.

The invention claimed is:

1. A glass composition for glass fiber comprising:
   $SiO_2$ in a range of 50.0 to 70.0% by mass,
   $Al_2O_3$ in a range of 10.0 to 30.0% by mass,
   ZnO in a range of 8.0 to 25.0% by mass,
   MgO in a range of 0.0 to 4.0% by mass,
   CaO in a range of 0.0 to 5.0% by mass,
   $P_2O_5$ in a range of 0.0 to 8.0% by mass,
   $TiO_2$ in a range of 0.0 to 2.5% by mass, and
   $Li_2O$, $Na_2O$, and $K_2O$ in a range of 0.0% by mass or more and less than 1.0% by mass in total, with respect to the total amount, wherein
   when a content of $SiO_2$ is defined as S, a content of $Al_2O_3$ is defined as A, a content of ZnO is defined as Z, a content of MgO is defined as M, a content of CaO is defined as C, and a content of $P_2O_5$ is defined as P,
   a ratio of the total content of CaO and MgO to the content of ZnO ((M+C)/Z) is 0.46 or less, and
   the S, A, and P satisfy following formula (1-1):

$$28.0 \le \{(S-P) \times (A-P)\}^{1/2} \le 36.9. \quad (1\text{-}1)$$

2. The glass composition for glass fiber according to claim 1, wherein the S, A, and P satisfy following formula (1-2):

$$28.6 \le \{(S-P) \times (A-P)\}^{1/2} \le 33.8. \quad (1\text{-}2)$$

3. The glass composition for glass fiber according to claim 1, wherein the S, A, and P satisfy following formula (2-1):

$$P \times \{Z/(Z+C+M)\} \times (S/A) \le 10.72. \quad (2\text{-}1)$$

4. The glass composition for glass fiber according to claim 1, wherein the S, A, Z, M, C, and P satisfy following formulas (1-3) and (2-2):

$$29.5 \le \{(S-P) \times (A-P)\}^{1/2} \le 31.2 \quad (1\text{-}3)$$

$$7.15 \le P \times \{Z/(Z+C+M)\} \times (S/A) \le 10.40. \quad (2\text{-}2)$$

5. The glass composition for glass fiber according to claim 1, comprising
   $Al_2O_3$ in a range of 20.5 to 25.0% by mass, and
   ZnO, MgO, and CaO in a range of 15.5 to 25.0% by mass in total, with respect to the total amount.

6. Glass fiber formed from the glass composition for glass fiber according to claim 1.

7. A glass fiber woven fabric formed from the glass fiber according to claim 6.

8. A glass fiber-reinforced resin composition comprising the glass fiber according to claim 6.

* * * * *